Sept. 29, 1925.          1,555,323
L. L. MARY, NOW BY JUDICIAL CHANGE
    OF NAME L. L. LOMAR
         SHOCK ABSORBER
       Filed April 19, 1921       2 Sheets-Sheet 1
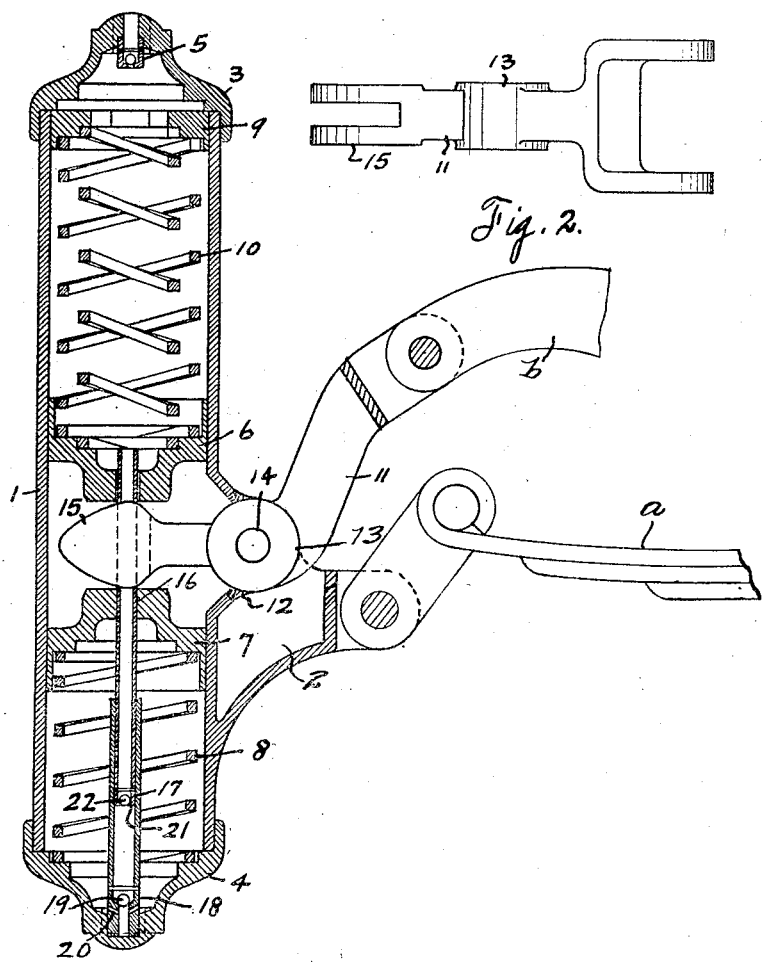

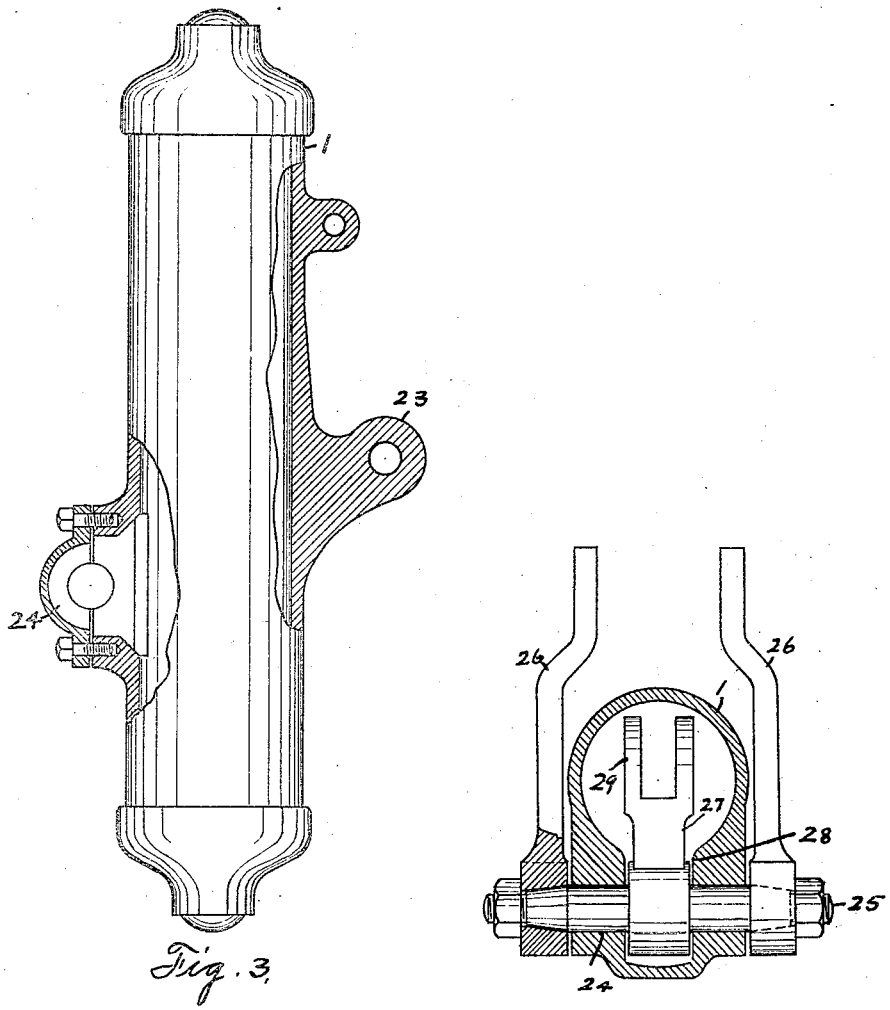

Patented Sept. 29, 1925.

1,555,323

UNITED STATES PATENT OFFICE.

LOUIS L. MARY, NOW BY JUDICIAL CHANGE OF NAME LOUIS LEON LOMAR, OF HOUSTON, TEXAS.

SHOCK ABSORBER.

Application filed April 19, 1921. Serial No. 462,577.

*To all whom it may concern:*

Be it known that I, LOUIS L. LOMAR, formerly LOUIS L. MARY, a citizen of the United States, residing at Houston, in the county of Harris and State of Texas, have invented certain new and useful Improvements in a Shock Absorber, of which the following is a specification.

This invention relates to new and useful improvements in a shock absorber.

One object of the invention is to provide a device of the character described designed for application to a motor vehicle, and interposed between the springs and chassis to absorb the shocks incident to the movement of the vehicle over rough roads.

Another object is to provide a shock absorber wherein provision is made for lubricating the working parts.

With the above and other objects in view this invention has particular relation to certain novel features of construction, operation and arrangement of parts, an example of which is given in this specification and illustrated in the accompanying drawings, wherein:—

Figure 1 is a vertical sectional view of the form of device applicable to the rear springs of the vehicle.

Figure 2 shows a plan view of a connecting lever employed.

Figure 3 shows a side view of the form used for application to the front springs, and Figure 4 shows a transverse sectional view thereof.

Referring now more particularly to the drawings, the numeral 1 designates a tubular casing which is formed with the lateral bracket 2 for attachment to the rear free end of the vehicle spring. The upper and lower ends of this casing are closed by means of the top and bottom caps 3 and 4, the former of which has an air inlet controlled by the valve 5.

Within the casing are the cup-shaped plungers 6 and 7, which are spaced apart as shown. Interposed between the cap 4 and the plunger 7 there is a strong coil spring 8. Threaded into the upper end of the casing 1 there is a ringlike plug 9 and interposed between this plug and the plunger 6 there is a double coiled spring 10.

The numeral 11 designates a connecting lever which works through an opening 12 in the side of the casing and is formed with a transverse bearing 13 which works on a pin 14 which is fixed in the casing. The inner end of this lever is formed with a cam-shaped head 15 which works between the plungers and is formed with a vertical slot. The outer end of this lever is bifurcated, the fingers thereof being adapted to embrace the end of the chassis frame which is bolted thereto.

An oil tube is provided, formed of the sections 16 and 17, the former of which telescopes within the latter. The lower end of the lower section is anchored to the cap 4 and is formed with a valve seat 18 which is controlled by the valve 19 and oil conduits 20 are provided through this tube beneath said valve. The upper section extends up through central bearings in the plungers and works through the slot of the head 15. The lower end of the upper section is formed with a valve seat 21, controlled by the valve 22. A sufficient quantity of oil is placed in the casing to sufficiently lubricate the working parts. This oil gradually works down past the plungers into the chamber beneath the lower plunger 7. During the movement of the car this plunger reciprocates up and down and the oil is thereby pumped up through the oil tube into the upper chamber above the plunger 6 and the oil is thereby kept in circulation.

In the form shown in Figures 3 and 4, the internal construction is the same as that shown in Figures 1 and 2. The means for attachment, however, is different.

In this form the casing has a lug 23, formed integrally therewith, for attachment to the front end of the chassis and on the opposite side has a bearing 24, to receive a transverse bearing pin 25. Arms 26, 26 have bearings at one end which work on the ends of said pin. These arms embrace the casing and their other ends are attached to the front end of the front spring.

Fixed to the pin 25 there is a lever 27 which works through a suitable opening 28 in the side of the casing 1 and whose inner end is formed with a head 29 similar to the head 15 and working between the plungers for the purposes explained.

It is obvious that the springs 8 and 10 will absorb the shocks imparted to the vehicle incident to its movement over rough roads.

What I claim is:—

1. A shock absorber for motor vehicles, comprising a tubular casing having closed ends, means for attaching said casing to the vehicle spring, spaced plungers in said casing forming chambers between said plungers and the respective ends of the casing, yieldable cushions interposed between each plunger and the corresponding end of the casing, a lever pivoted to said casing, one end of said lever working between said plungers and the other end of said lever being connected to the frame of the vehicle, and a valve-controlled conduit through which lubricant is forced from the lower chamber, by the plunger therein, into the upper chamber.

2. A shock absorber for motor vehicles, comprising a tubular casing having closed ends, the upper end of said casing having a valve-controlled port, means for attaching said casing to the vehicle spring, spaced plungers in said casing forming chambers between said plungers and the respective ends of the casing, yieldable cushions interposed between each plunger and the corresponding end of the casing, a lever pivoted to said casing, one end of said lever working between said plungers and the other end of said lever being connected to the frame of the vehicle, and a valve-controlled conduit through which lubricant is forced from the lower chamber, by the plunger therein, into the upper chamber.

3. A shock absorber comprising a casing adapted to be connected to the free end of a vehicle spring, a pivoted lever having an end extended into said casing and an end adapted to be connected to the frame of said vehicle, opposed plungers within said casing, the inwardly extended end of said lever being operatively related to said plungers, and a tubular conduit extending through said plungers and forming a passage for lubricant from one side of said plungers to the other.

4. A shock absorber comprising a casing adapted to be connected to the free end of a vehicle spring, a lever pivotally connected to the frame of said vehicle and having an end extended into said casing, opposed plungers within said casing, the inwardly-extended end of said lever being operatively positioned between said plungers, and a valve-controlled conduit through which lubricant may pass from one side of said plungers to the other.

5. A shock absorber comprising a casing adapted to be connected to the free end of a vehicle spring, a lever pivoted to said casing and having an end extended into said casing and an end adapted to be connected to the frame of said vehicle, yieldable elements arranged in said casing to counteract one another, spaced plungers operably interposed between said elements, the inwardly extended end of said lever being operatively positioned between said plungers, and a valve-controlled conduit through said plungers forming a passage for lubricant from one side of said plungers to the other.

6. A shock absorber comprising a casing adapted to be connected to the free end of a vehicle spring, opposed plungers within said casing, a cam element operably mounted on said casing, said cam element being adapted to be connected to the frame of said vehicle and being operatively related to said plungers, and a valved conduit through which lubricant may pass from one side of said plungers to the other.

7. A shock absorber comprising a casing adapted to be attached in fixed relation to a vehicle spring, a lever pivoted to said casing and having an end extended into said casing and an end adapted to be pivotally connected to the frame of said vehicle, yieldable elements in said casing, spaced plungers operably interposed between said elements, the inwardly-extended end of said lever having cam faces in operative relation with said plungers, and a conduit extending through said plungers and adapted to form a passage for lubricant from one side of said plungers to the other.

8. A shock absorber comprising a casing, a lever pivoted to said casing and having an end extended into said casing, the other end of said lever and the casing being adapted to be connected to relatively movable parts of a vehicle, yieldable elements arranged in said casing to counteract one another, spaced plungers operably interposed between said elements, the inwardly extended end of said lever being operably interposed between said plungers, and a valved conduit extending through said plungers and adapted to form a passage for lubricant from one side of said plungers to the other.

9. A shock absorber comprising a casing, a lever pivoted to said casing and having an end extended into said casing, said lever and said casing being adapted to be connected to relatively movable parts of a vehicle, opposed plungers within said casing, the inwardly extended end of said lever being operatively related to said plungers, and a tubular conduit extending through said plungers, the operation of said plungers being adapted to force lubricant through said conduit to effect lubrication of the device.

10. A shock absorber comprising a casing, a lever pivoted to said casing and having an end extended into said casing, the casing and lever being adapted to be connected to relatively movable parts of a vehicle, opposed plungers in said casing, resilient means between each plunger and the corresponding end of the casing, the inwardly-extended end of said lever being operatively positioned between said plungers, and a tubular conduit forming a passage for lubricant from one side of said plungers to the other.

11. A shock absorber comprising a casing adapted to contain a lubricant, opposed pistons within said casing, a lever element projecting within said casing in operative relation with said pistons, said lever element and said casing being adapted to be connected to relatively movable parts of a vehicle, and a valve-controlled conduit supported in the lower part of said casing and cooperating with the action of the lower piston to conduct the lubricant to the mechanism in the casing.

12. A shock absorber comprising a casing, a lever pivoted to said casing and having an end extended into said casing, the lever and the casing being adapted to be connected to relatively movable parts of a vehicle, opposed plungers within said casing, the inwardly-extended end of said lever having opposite cam faces in operative relation with said plungers, and a valved conduit through which lubricant may pass from one side of said plungers to the other.

13. A shock absorber comprising a casing, a lever pivoted to said casing, the casing and lever being adapted to be connected to relatively movable parts of a vehicle, said lever extending into said casing and having its inwardly-extended portion bifurcated, opposed pistons in said casing, the bifurcated portion of said lever working between said pistons, and a valved conduit extending through said pistons and between the forks of said bifurcated lever, whereby lubricant is forced from one side of the plungers to the other.

14. A shock absorber comprising a casing, opposed pistons within said casing, a cam element operably mounted on said casing and operatively related to said pistons, said casing and said cam element being adapted to be connected to relatively movable parts of a vehicle, and a valve-controlled conduit through which lubricant may pass from one side of said pistons to the other.

15. A shock absorber comprising a casing having closed ends, a lever pivoted to said casing, the casing and lever being adapted to be connected to relatively movable parts of a vehicle, the free end of said lever extending into said casing, opposed plungers in said casing forming chambers between said plungers and the respective ends of said casing, the inwardly-extending end of said lever working between said plungers, a valved conduit extending through said plungers and connecting said chambers, said conduit being fixed to one of said plungers, a valved guide sleeve mounted in the lower chamber, the lower end of said conduit telescoping with said guide sleeve, whereby lubricant is forced from the lower chamber into the upper chamber by operation of said plungers.

In testimony whereof I have signed my name to this specification.

LOUIS L. LOMAR,
[*formerly Louis L. Mary.*]